Figure 1:
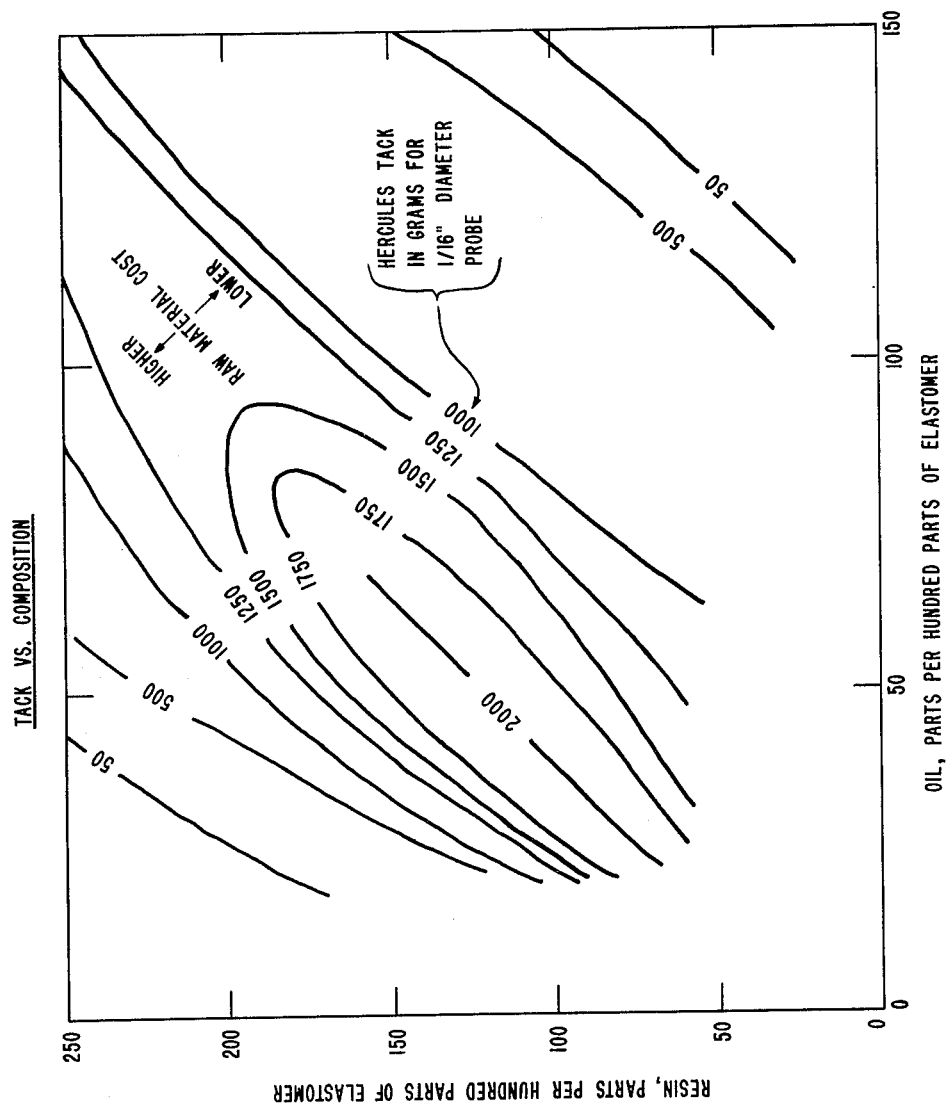

United States Patent Office 3,239,478
Patented Mar. 8, 1966

3,239,478
BLOCK COPOLYMER ADHESIVE COMPOSITIONS AND ARTICLES PREPARED THEREFROM
James T. Harlan, Jr., Torrance, Calif., assignor to Shell Oil Company, New York, N.Y., a corporation of Delaware
Filed June 26, 1963, Ser. No. 290,710
11 Claims. (Cl. 260—27)

This invention relates to improved adhesive compositions. More particularly, it relates to adhesive compositions having improved tack, cohesive strength and other properties.

The art in the adhesives field is replete with compositions based on natural and synthetic materials of varied kinds. A large and growing proportion of the adhesives produced in this country is comprised of synthetic high polymers combined with tackifying resins, fillers, plasticizers, stabilizers, extenders, etc. For the most part, however, each of these types exhibits certain technical or economic limitations. In all cases, a balance must be struck between properties (strength, stability, tack, etc.) and total adhesive cost. Usually, the addition of low cost ingredients adversely affects at least some of the desirable properties. An important goal in adhesive manufacture is to develop means of using low-cost components such that adhesive properties remain satisfactorily high.

One of the problems involved in the compounding of adhesive compositions relates not so much to the adhesive quality of the composition to a base such as paper, metal, plastic, etc., but on the contrary, is concerned with the cohesive strength of the material within its own body. Materials which are known in the adhesive art to impart high cohesive strength have deficiencies. Polymers may be permanently cross-linked as in cured epoxy resins or in postvulcanized rubber adhesives, but the cost of raw materials and the need for special treatment before, during, and after application often make this type of material undesirable. On the other hand, uncrosslinked polymers usually have little strength below their glass transition point and are hard and brittle above that temperature. Some materials do exhibit higher cohesive strength combined with flexibility, for example, neoprene and polyamides, but the cost of these materials is undesirably above that of usual adhesive components.

The incorporation of petroleum oils and the like to increase flexibility and lower cost in adhesive compositions containing polymers such as natural rubber has been strictly limited due to the rapid degrading of the cohesive strength of the composition by such oils. However, the cost of such oils is so low that their use would be extremely attractive if a composition could be found in which they could be incorporated in substantial proportions without deleteriously effecting the properties of the resulting compositions.

It is an object of the present invention to provide improved adhesive compositions. It is a particular object of the invention to provide improved pressure sensitive adhesive compositions. Another major object of the invention is to provide improved hot melt adhesives. Other objects of the invention are to provide improved sealants, caulking compounds, binders, adhesive coatings, bonding agents, solvent-based adhesives, mastics, tile cements, etc. A further particular object of the invention is to provide improved adhesive latices. Related objects of the invention comprise the provision of articles, tapes and films as well as laminates bonded or coated with the adhesive compositions of the invention. Other objects will become apparent during the following detailed description of the invention.

Now, in accordance with the present invention, improved adhesive compositions are provided comprising a block copolymer having a general configuration

A—B—A wherein each A is a thermoplastic polymer block with a glass transition temperature above room temperature and which is relatively incompatible with the elastomeric B segment; the average molecular weight of each A being between about 5,000 and 125,000; B is a polymer block of a conjugated diene, the average molecular weight of the blocks being between about 15,000 and about 250,000; the total of blocks A being less than about 80% by weight of the block copolymer; in addition to the block copolymer a tackifying resin and a particular extender oil, said oil being substantially incompatible with homopolymers of the aforesaid thermoplastic terminal blocks and being substantially incompatible with homopolymers of the aforesaid conjugated diene.

In accordance with special aspects of the present invention, compositions are provided having improved tack and cohesive strength comprising a combination of the block copolymer described above with 5–200 phr. (preferably 25–125 phr.) (parts per hundred of block copolymer) of extending oil to be described further hereinafter and 25–300 phr. (preferably 50–200 phr.) of a tackifying resin. Hot-melt adhesive compositions are provided by adjustment of the proportions of the three basic ingredients and choice of molecular weight of copolymer, melting point and type of tackifying resin, compatibility of oil and resin with the copolymer to provide the properties suitable for a hot-melt adhesive.

In further accordance with the invention, adhesive latices are provided wherein the above types of adhesive compositions are dispersed in an aqueous medium to form a latex. They may, of course, be utilized in the form of cements wherein the composition of the three basic components is dispersed in a relatively volatile solvent therefor.

Figure 2:
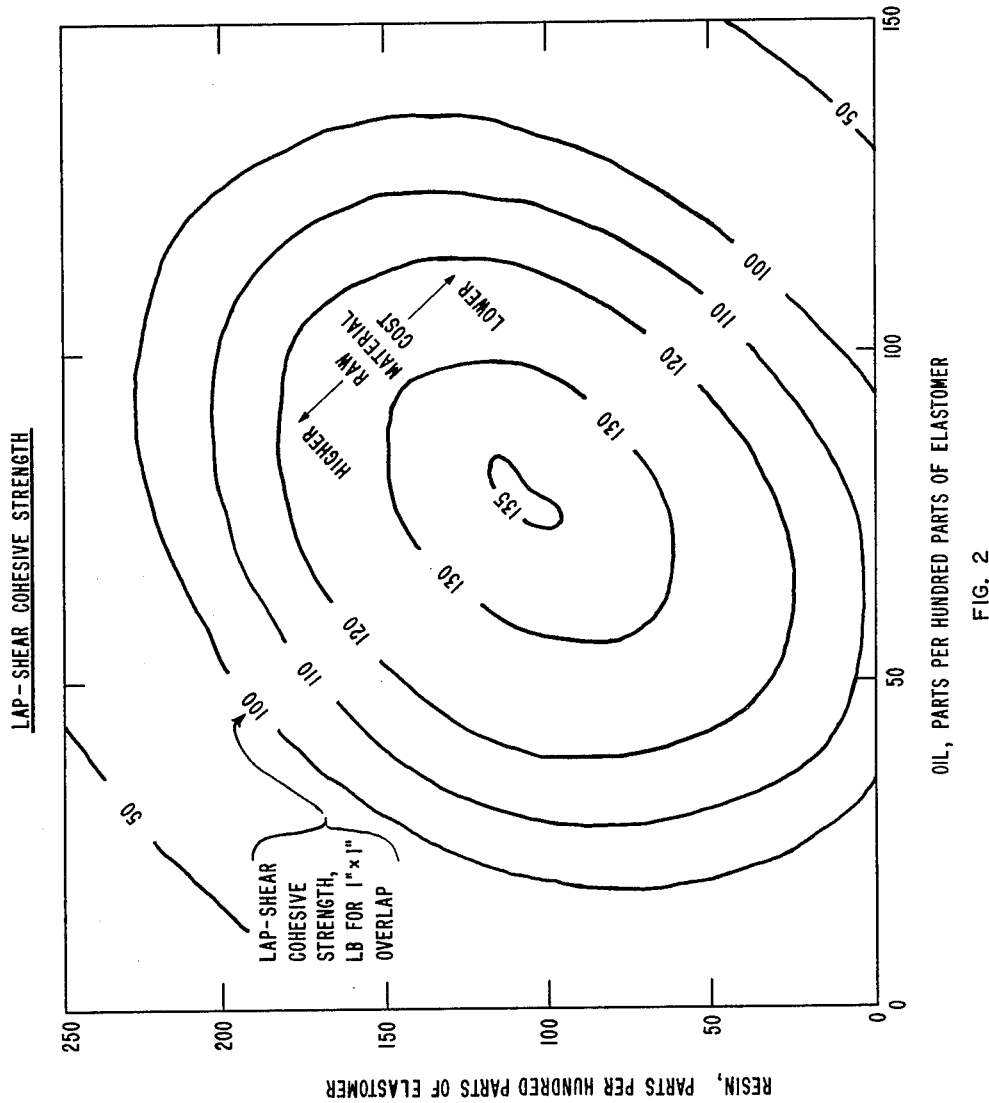

FIGURES 1 and 2 illustrate the relationship of compositions to two important properties of pressure sensitive adhesives, namely, cohesive strength and tack. These are also indicated by the figures relative to the raw material costs of the components involved. According to the figures, it will be noted that a maximum appears in the cohesive strength at about 75 phr. of oil and 100 phr. resin. However, a large region lies within the 100 pound contour of cohesive strength which is more than adequate for all the usual pressure sensitive adhesive applications. It will be seen from FIGURE 1 that tack greater than 1250–1500 grams (comparable to that shown by natural rubber controls and commercial pressure sensitive cellophane tape) can be obtained in an elongated region running from about 20 phr. of oil and 50 phr. of resin to about 100 phr. of oil and 180 phr. resin.

Tack, as related to pressure sensitive adhesives, is a composite of several other properties including surface stickiness, tensile strength, viscosity, hardness, etc. Since it is a time- and pressure-dependant property, tack must be measured under specific conditions chosen here to be one second and a pressure of 10 grams for a $\frac{1}{16}''$ diameter brass contact surface. This property is measured by the method described in "The Characterization of Pressure Sensitive Adhesives" by Wetzel, ASTM Bulletin No. 221, page TP72–76, April 1957.

There is an increasing demand in modern high speed manufacturing, such as in the fabrication of shoes and cardboard cartons, for strong adhesives which, when applied in molten form develop strength and lose tack in a matter of seconds. These so-called hot melt adhesives are relatively new products the need for which is growing rapidly as more effective continuous applicators are developed and their cost advantages demonstrated. In the past, low molecular weight waxes and resins have been used. However, these exhibit low strength, undesirable rigidity and relatively slow setting rates. More useful adhesives are prepared by blending high molecular weight polymers such as polyvinyl acetate, but elastomers such as natural rubber are not commonly used. Newer materials such as polyamides are used, but these materials are high in cost. The compositions of the present invention are not only low in cost but may be formulated to meet the physical requirements of hot-melt adhesives. Qualitative test on compositions falling within the present invention, indicate that stickiness toward paper and polyvinyl chloride sheeting falls rapidly from 95 to 75° C. The compositions have been found to be excellent for the bonding of polar substrates such as leather, polyvinyl chloride, paper, etc.

The elastomer latex adhesives find use particularly in bonding leather, fabric, plastics, paper, etc. such as in shoe manufacturing and packaging industries. Uncured natural rubber, styrene-butadiene rubber, and the like are used where high cohesive strength is not required. Where stronger bonds are needed, neoprene and other high cost latices or harder-to-use post curing formulations of the weaker elastomers are specified. Latex adhesives made from the compositions of the present invention compete quality-wise in adhesive and cohesive strength with neoprene latices but have a marked advantage in lower raw material costs due to the possibility of utilizing substantial proportions of low cost oils.

Stable latices may be successfully prepared from oil-extended block copolymers described more fully hereinafter. For example, cyclohexane solutions of the block copolymer may be emulsified with an aqueous soap solution which may then be treated to remove the solvent (cyclohexane) resulting in the formation of a latex. The resin may be compounded with the oil extended block copolymer by blending the latex with a resin emulsion or by including the resin in the original solution prior to emulsification. Maximum strength of bonds made with adhesive latices of the present type are improved by heating the joints after their formation to temperatures in the order of 100–175° C. for a fraction of a second to 15 minutes.

The primary component of the adhesive compositions of the present invention are block copolymers having the general configuration

A—B—A wherein the polymer blocks A are plastic polymer blocks which, as homopolymers have glass transition temperatures above 20° C., while the center elastomeric polymer blocks are derived from at least one conjugated diene such as butadiene or isoprene. These block copolymers may, if desired, be partially or completely hydrogenated. When employed within the relative proportions more fully discussed hereinafter, these block copolymers have the peculiar property of exhibiting the physical characteristics of a rubber which has been vulcanized even though the block copolymer has not been subjected to any vulcanization treatment. The advantage of such a property is many fold, relating to the improved stress-strain properties of the block copolymer characteristic of vulcanized rubbers while at the same time, still possessing solubility characteristics of unvulcanized materials.

It is a well-known fact that most if not all vulcanized rubbers of ordinary characteristics such as natural, polybutadiene, etc., become highly insoluble after they have been subjected to vulcanization. Furthermore, the elimination of the necessity for vulcanizing removes one of the complications in the use of these adhesive compositions compared with adhesives made from ordinary rubber-like materials. The choice of species and molecular weights of each of the individual blocks of these block copolymers is based upon findings that an optimum combination of properties is obtained by utilizing block copolymers having the limitations now to be described. While the specific molecular weight of the center block prepared from the conjugated diene and the plastic terminal blocks may be varied for specific end uses, it is preferred that the elastomeric center blocks have an average molecular weight from about 15,000 to about 250,000 (more particularly 25,000–150,000) and that the terminal plastic blocks prepared from vinyl arene comprise 20–80% by weight of the entire block copolymer, the individual molecular weights of these terminal plastic blocks being coordinated for this purpose with the average molecular weight of the center elastomeric block.

The terminal blocks are those having average molecular weights between about 5,000 and 125,000, preferably 15,000–100,000. These terminal blocks are prepared by polymerization of vinyl monomers and/or acrylic monomers and should have glass transition temperatures above about 50° C., the difference in glass transition temperature between that of the center block and of the end blocks being greater than about 100° C. If the glass transition temperatures of the center block and end blocks respectively are in an area substantially less than this limit, the block copolymers do not exhibit the self curing property shown by the copolymers of the present invention and the associated highly desirable adhesive properties for the compositions referred to hereinbefore.

The non-elastomeric end blocks may comprise homopolymers or copolymers of vinyl monomers such as vinyl arenes, vinyl pyridines, vinyl halides and vinyl carboxylates, as well as acrylic monomers such as acrylonitrile, methacrylonitrile, esters of acrylic acids etc. Monovinyl aromatic hydrocarbons include particularly those of the benzene series such as styrene, vinyl toluene, vinyl xylene, ethyl vinyl benzene as well as dicyclic monovinyl compounds such as vinyl naphthalene and the like. Other non-elastomeric terminal polymer blocks may be derived from alpha olefins, alkylene oxides, acetals, urethanes, etc.

The center elastomeric blocks are prepared from conjugated dienes such as isoprene, butadiene, copolymers of styrene and butadiene as well as their homologues.

While the process for the preparation of these block copolymers does not form a part of the present invention, it may be stated that there are several alternative routes to their preparation. For example, they may be prepared by the use of lithium based initiators either in polar or non-polar solvents dependent upon the structure of the conjugated diene polymer blocks desired. For some purposes, a high cis structure of the center block is desirable particularly when employing isoprene. This is achieved by polymerization in the presence of non-polar solvents. If a more branched structure is desired, more or less polar solvents such as tetrahydrofuran and the like may be present. Thus, lithium based catalysts such as lithium metal, alkyl lithiums and dilithium initiators may be employed. Butyl lithium and other alkyl lithiums having up to 8 carbon atoms per alkyl radical are preferred, when a three-stage copolymerization process is contemplated. If however a two-stage process is preferable, then dilithium initiators may be utilized or coupling reactions may be considered wherein a block copolymer of, for instance, polystyrene with polybutadiene is coupled by the use of a dichloro aromatic compound such as dichloro benzene or with a divinyl arene such as divinyl benzene to form a coupled polymer wherein the center block comprises a coupled elastomeric block.

The block copolymers forming an essential component of the present invention may be modified if desired by hydrogenation which may be either partial or complete. Selected conditions may be employed for example to hydrogenate the elastomeric diene center block while not so modifying the vinyl arene polymer blocks. Other conditions may be chosen to hydrogenate substantially uniformly along the polymer chain, both the elastomeric and non-elastomeric blocks thereof being hydrogenated to practically the same extent, which may be either partial or complete. The hydrogenation of the block copolymer may change its compatability with the extender oils and thus broaden out the type of oil which may be employed in these compositions.

The compositions may be modified, if desired, with such materials as antioxidants and stabilizers. These include stabilizers for protection of both the diene center blocks and the non-elastomeric terminal blocks. Combinations of stabilizers are often more effective, due to the different mechanisms of degradation to which each of these types of blocks is subject. Certain hindered phenols, organo-metallic compounds, aromatic amines and sulfur compounds are useful for this purpose. Especially effective types of these materials includes the following:

(1) Benzothiazoles, such as 2-(dialkyl-hydroxybenzyl-thio)benzothiazoles,
(2) Esters of hydroxybenzyl alcohols, such as benzoates, phthalates, stearates, adipates or acrylates of 3,5-dialkyl-4-hydroxybenzyl alcohols,
(3) Stannous phenyl catecholates,
(4) Zinc dialkyl dithiocarbamates,
(5) Alkyl phenols, e.g., 2,6-di-tert-butyl-4-methyl phenol.

While the block copolymers comprise the principal and sometimes sole elastomeric component of these adhesive compositions, they may be mixed with minor proportions of other ordinary elastomers such as natural rubber, synthetic polyisoprene, polybutadiene, neoprene, polybutylenes, ethylene propylene rubbers, etc.

The tackifying resins employed together with the subject block copolymers and oils are represented by the following:

Rosin
Dehydrogenated rosin
Rosin+polyterpene resins, e.g., polymerized betapinene (from 100% rosin to 100% resin)
Glycerol esters of hydrogenated rosin
Pentaerythritol esters of hydrogenated rosin
Coumarone-indene resins
Hydrogenated rosin
Glycerol esters of polymerized rosin
Maleic anhydride-modified rosin and rosin derivatives
Partial esters of styrene-maleic acid copolymers
Chlorinated biphenyls (S.P. 113–320° F.)
Oil-soluble phenol-aldehyde resins The extender oils employed together with the tackifying resins and block copolymers have the chief advantage of substantially reducing the cost of the composition while improving tack and flexibility without any material degradation in other properties thereof. The oils must be chosen with care to coordinate with the block copolymer relative to the compatability with the several polymer blocks present therein. As stated hereinbefore, the oil should be one which is substantially compatible with homopolymers of conjugated dienes but which is substantially incompatible with homopolymers of the non-elastic (thermoplastic) terminal blocks. Compatibility can be determined by the following type of test:

An oil to be tested is mixed in several proportions (e.g., 5, 50, 100 phr.) with the type of block copolymer of interest in a volatile mutual solvent, for example, toluene. A thin film is cast by spreading the solution evenly on a glass surface and allowing the solvent, toluene, to evaporate over a period of 16–24 hours at ambient temperature. Suitability of the oil for use as an extender is judged by the tensile strengths of the oil-containing polymer films determined in pounds per square inch by an appropriate testing instrument and by the appearance of the film surface. Excessive compatibility with the terminal polymer segments will cause severe loss of tensile strength, greater than that resulting from simple dilution of the polymer. Excessive incompatibility will be evidenced by diffusion of the oil to the film surface.

Table I, which follows, gives properties of typical extender oils suitable for use in the present invention.

PROPERTIES OF EXTENDER OILS

| Oil | A | B | C | D | E | F | G | H | I | J | K | L |
|---|---|---|---|---|---|---|---|---|---|---|---|---|
| Specific Gravity, 60° F | 0.8644 | 0.8827 | 0.9018 | 0.9082 | 0.9352 | 0.9082 | 0.9159 | 0.8783 | 0.8990 | 0.9153 | 0.9309 | 0.9230 |
| Color, ASTM | 0.5 | 17 Bay | L2.0 | L1.5 | 6 | L2.0 | L1.5 | L1.0 | 1.5 | L2.0 | L2.0 | 5.0 |
| Flash Point, COC, ° F | 380 | 330 | 330 | 335 | 345 | 385 | 375 | 430 | 410 | 420 | 430 | 480 |
| Fire Point, ° F | 430 | 370 | 370 | 375 | 390 | 435 | 435 | 500 | 470 | 470 | 500 | 550 |
| Pour Point, ° F | 10 | −50 | −50 | −30 | −35 | −35 | −20 | −10 | −30 | −20 | 0 | 5 |
| Viscosity, S.S.U. 100° F | 103 | 98.2 | 107 | 101 | 164 | 215 | 205 | 256 | 430 | 559 | 840 | 2109 |
| Viscosity, S.S.U. 210° F | 39.5 | 34.8 | 38.3 | 38.1 | 40.7 | 44.3 | 44.0 | 49.3 | 54.7 | 56.3 | 66.4 | 98 |
| Neut. No. mg. NOH/gm | 0.025 | 0.01 | 0.03 | 0.01 | 0.025 | 0.025 | 0.01 | 0.01 | 0.025 | 0.025 | 0.01 | 0.025 |
| Refractive Index, 20° C | 1.4740 | 1.4799 | 1.4930 | 1.5030 | 1.5195 | 1.4963 | 1.5080 | 1.4815 | 1.4890 | 1.5005 | 1.5160 | 1.5057 |
| Aniline Point, ° F | 210 | 196 | 170 | 157 | 136 | 179.5 | 165 | 222 | 211 | 187 | 183 | 199 |
| Volatile Loss, 22 hrs., 225° F, Percent w | 0.9 | 6.24 | 7.0 | 6.4 | 3.35 | 5.1 | 2.3 | 0.2 | 0.9 | 0.8 | 0.3 | 0.1 |
| Viscosity—Gravity Constant | 0.818 | 0.84 | 0.860 | 0.872 | 0.896 | 0.858 | 0.871 | 0.820 | 0.837 | 0.856 | 0.872 | 0.852 |
| UV absorptivity, $K_{260}$ | 0.5 | 0.24 | 2.1 | 8.7 | 17.3 | 5.5 | 10.2 | 1.3 | 0.7 | 4.3 | 13.5 | 6.3 |
| Distillation, ° F.: | | | | | | | | | | | | |
| IBP | 642 | 616 | 600 | 566 | 628 | 600 | 610 | 719 | 710 | 718 | 635 | 780 |
| 5% | 674 | 628 | 635 | 625 | 642 | 651 | 645 | 754 | 745 | 750 | 726 | 819 |
| 10% | 682 | 636 | 645 | 631 | 656 | 670 | 680 | 762 | 757 | 760 | 766 | 838 |
| 50% | 704 | 672 | 700 | 693 | 686 | 760 | 745 | 820 | 810 | 813 | 850 | 913 |
| 90% | 744 | 728 | 769 | 788 | 736 | 840 | 815 | 879 | 865 | 868 | 925 | 980 |
| Mol. Type Anal., Clay-Gel, Percent w.: | | | | | | | | | | | | |
| Resins | 0.2 | 0.2 | 0.7 | 2.0 | 4.5 | 1.5 | 2.2 | 0.2 | 0.7 | 1.8 | 4.1 | 5.0 |
| Aromatics | 12.1 | 8.6 | 29.0 | 42.8 | 47.4 | 30.7 | 45.0 | 20.2 | 14.0 | 34.8 | 46.4 | 36.4 |
| Saturates | 87.7 | 91.2 | 70.3 | 55.2 | 48.1 | 67.8 | 52.8 | 79.6 | 85.3 | 63.4 | 49.5 | 58.5 |
| Carbon Atom Analysis, Percent: | | | | | | | | | | | | |
| Aromatics | 2 | 2 | 10 | 19 | 26 | 10 | 20 | 4 | 2 | 7.3 | 21 | 11 |
| Naphthenes | 36 | 49 | 43 | 34 | 36 | 43 | 31 | 34 | 46 | 42.6 | 29 | 37 |
| Paraffins | 62 | 50 | 47 | 47 | 38 | 47 | 49 | 62 | 52 | 50.1 | 50 | 52 |

It will be noted from the properties of the above table that these petroleum oils are relatively high boiling materials containing only a minor proportion of aromatic hydrocarbons preferably less than about 30% and more particularly less than about 15%, although with certain of the block copolymers having high vinyl arene contents, higher aromaticity of the extender oil may be tolerated.

The compositions of the present invention may be designed for a wide variety of uses and applications. They may be applied to paper, paper boards, wood, metal foils, polyolefin films, polyvinyl chloride films, cellophane, felts, woven fabrics, non-woven fabrics, glass, etc., and for bonding two or more of such materials together. The adhesives are useful in pressure sensitive tapes, such as masking tapes, adhesive sheets, primers for other adhesives, adhesive tapes, mending tapes, electrical insulation tape, laminates, hot-melt adhesives, mastics, cements, caulking compounds, binders, sealants, pressure sensitive adhesives otherwise, delayed tack adhesives, adhesive latices, shoe sole adhesives, cloth backings, carpet backings, cements, etc.

The following examples illustrate the use of the present invention.

EXAMPLE I.—PRESSURE SENSITIVE ADHESIVES

A sample of a polystyrene-polyisoprene-polystyrene block copolymer is blended in toluene solution with a non-aromatic extending oil and a tackifying resin. The pressure sensitive adhesive film used for tack measurements is prepared by evaporating overnight at ambient conditions a thin layer of this solution spread on glass. Cohesive strength is measured by allowing several successive layers of the solution to evaporate on two 1-inch wide canvas strips, pressing them together so that a 1-inch by 1-inch overlap is obtained, drying overnight, and pulling the lap shear test specimen to destruction at 0.2 inch/minute with an Instron tester.

The block copolymer had the composition:

Polystyrene-polyisoprene-polystyrene

First polystyrene block, molecular weight _____ 43,000
Polyisoprene block, molecular weight _____ 108,000
Final polystyrene block, molecular weight _____ 57,000
Weight percent styrene in polymer _____ 48

The oil had the properties listed in Table I as Type A. The tackifying resin was a glycerol ester of polymerized rosin, which has a softening point by the Hercules Drop Method of 110° C.

The adhesive formulation and the test results are as follows: A control sample based on natural rubber (milled smoked sheet) is shown for comparison:

|  | Block Copolymer Adhesive | Natural Rubber Control |
|---|---|---|
| Solution Composition, weight parts: |  |  |
| Block copolymer | 100 | 0 |
| Natural rubber | 0 | 100 |
| Oil | 75 | 0 |
| Tackifying resin | 125 | 150 |
| Toluene | 1,200 | 1,000 |
| Stabilizer a | 1 | 1 |
| Test Results: |  |  |
| Tack, grams for 1/16 inch probe | 1,950 | 1,400 |
| Cohesive strength, lb. for 1-inch plus 1-inch lap shear test piece | 125 | 3 | a One-half, a hindered phenol having the structure 2,2'-methylene bis(4-methyl-6-tert-butyl phenol), plus one-half a sulfur-containing organo-tin compound understood to be dibutyl-tin-bis(isooctylmercapto-acetate).

Other examples of pressure sensitive adhesives—same components as above.

|  | A | B | C |
|---|---|---|---|
| Solution Composition, wt. parts: |  |  |  |
| Block copolymer | 100 | 100 | 100 |
| Oil | 26 | 135 | 135 |
| Tackifying resin | 158 | 168 | 248 |
| Toluene | 1,200 | 1,200 | 2,000 |
| Stabilizer | 1 |  |  |
| Test Results: |  |  |  |
| Tack, gm. for 1/16-inch probe | 50 | 135 | 1,300 |
| Cohesive strength, lb. for 1" x 1" | 75 | 92 | 70 |

All of these and other similar formulations were used in preparing the contour plots shown in FIGURES 1 and 2.

EXAMPLE II.—HOT MELT ADHESIVES

These adhesive formulations were prepared either by blending block copolymer, oil, and tackifying resin in toluene solution and removing the solvent by a steam stripping operation or by mixing the components at 150° C. The block copolymers were either polystyrene-polyisoprene-polystyrene or polystyrene-polybutadiene-polystyrene. The oil was Type A listed in Table I. The tackifying resin was a coumarone-indene resin with a softening point of 94–107° C. (ball and shouldered ring).

|  | A | B |
|---|---|---|
| Block Copolymer Composition: |  |  |
| Elastomeric center block | (1) | (2) |
| First polystyrene block, mol. wt | 22,000 | 87,000 |
| Center block, mol. wt | 62,000 | 17,000 |
| Final polystyrene block, mol. wt | 20,000 | 55,000 |
| Wt. percent styrene in polymer | 41 | 89 |
| Adhesive Composition (toluene-free), wt., parts: |  |  |
| Block copolymer | 100 | 100 |
| Oil | 100 | 100 |
| Tackifying resin | 100 | 100 |
| Stabilizer (same as in Example I) | 1 | 1 |
| Test Results: |  |  |
| Lap shear cohesive strength lb. per 1" x 1" overlap | 153 | 30 |

1 Polybutadiene.
2 Polyisoprene.

Sample B, lying outside the range of polystyrene content according to the present invention, indicates the low lap shear cohesive strength is obtained if the plastic content of the block copolymer is too high.

EXAMPLE III.—LATEX ADHESIVES

Latex adhesives were prepared by blending a block-copolymer-plus-oil latex with an aqueous emulsion of tackifying resin. The oil extended block copolymer latex was formed by (1) vigorously mixing a cyclohexane solution of polymer and oil with a 1% solution of a soap, prepared by neutralizing disproportionated rosin with potassium hydroxide to a pH of 10.5–11.0, (2) evaporating the cyclohexane, and (3) centrifuging to concentrate the latex to about 65 weight percent solids.

Adhesive joints were prepared by coating 1-inch wide canvas strips with the latex and pressing the strips in a press heated to 125° C. so that a 1-inch by 1-inch contact area was joined. The lap shear cohesive strength was determined by pulling the joint to destruction at 0.2 inch per minute with an Instron Tester; the maximum stress reached is recorded as cohesive strength.

The block copolymer used was a polystyrene-polyisoprene-polystyrene polymer with the segment molecular weights of 72,000; 91,000; and 77,000, respectively. The styrene content was 62% w. The oil was Type A described in Table I above. The resin was that described in Example I. Composition of the adhesive on a water-and-soap-free basis is shown below together with test results.

Composition (water-free), wt. parts:
Block polymer _____ 100
Oil _____ 75
Tackifying resin _____ 100
Stabilizer (as in Table I) _____ 1

Test results:
Lap shear cohesive strength, lb. per 1" x 1"__ 128
Canvas/canvas peel strength (cohesive failure), lb. per inch width _____ 12.5

EXAMPLE IV

A substantially saturated hydrogenated block polymer having the structure

Polystyrene-polybutadiene-polystyrene prior to hydrogenation (15,000–75,000–15,000 mol weight) was dissolved in toluene to form a 20% solution. Varying amounts of a naphthenic extender oil and a polymerized terpene tackifying resin were added and the solution stirred until homogeneous. Samples were prepared by spreading films on glass and drying in nitrogen. Lap shear samples were made by overlapping 1 inch canvas strips which had been coated and dried several times and pressed gently at room temperature; the samples (1" x 1" overlapping) were dried 24–76 hours at ambient temperatures and pressure in a nitrogen atmosphere. The test results are summarized below.

| Sample No. | Oil[a] Content, phr. | Oil[b] Content, phr. | Hercules Tack[c] gm. per 1/16" probe | Cohesive Strength Lap Shear, lb./in. Width |
|---|---|---|---|---|
| AA-387 | 50 | 75 | 650 | 120 |
| 388 | 50 | 50 | 400 | 175 |
| 389 | 50 | 150 | 1,650 | 21.5 |
| 390 | 25 | 75 | 1,000 | 200 |
| 391 | 75 | 150 | 1,475 | 30 |

[a] Naphthenic extender oil.
[b] Polymerized terpenes.
[c] Natural rubber control showed 1,000-1,200 gm. at this time.

The above data indicate that these compositions have outstanding tack and cohesive strength.

EXAMPLE V

The block copolymer employed in this example was poly(2-vinyl pyridine)–butadiene–poly(2-vinyl pyridine) having block molecular weights of 10,000–75,000–10,000. This polymer was treated in the same manner as in the foregoing example except that the solvent was modified with a sufficient amount of methyl ethyl ketone to give a clear solution. The tests obtained on this composition are as follows:

| Sample No. | Oil[a] Content, phr. | Oil[b] Content, phr. | Hercules Tack[c] gm. per 1/16" probe | Cohesive Strength Lap Shear, lb./in. Width |
|---|---|---|---|---|
| AA-397 | 50 | 100 | 1,400 | 21 |
| 398 | 50 | 50 | 1,050 | 197 |
| 399 | 50 | 150 | 650 | 40 |
| 400 | 25 | 100 | 400 | 87 |
| 401 | 75 | 150 | 1,100 | 51 |

[a] Naphthenic oil.
[b] Polymerized terpene resin.
[c] Natural rubber control showed 1,000-1,200 tack at this time.

The above data indicate that this polymer produces pressure sensitive adhesive compositions with outstanding tack and cohesive strength. The presence of polar radicals in the molecule provides superior adhesive strength to polar or metallic surfaces.

I claim as my invention:
1. An adhesive composition comprising
   (a) 100 parts by weight of a block copolymer having the general configuration

A—B—A wherein
   (1) each A is an independently selected polymer block of a vinyl arene, the average molecular weight of each A being between about 5,000 and about 125,000;
   (2) B is a polymer block of a conjugated diene, the average molecular weight of the block being between about 15,000 and about 250,000;
   (3) the total blocks A being less than about 80% by weight of the copolymer;
   (b) 25–300 parts by weight of a tackifying resin, and
   (c) 5–200 parts by weight of an extender oil, said oil being substantially compatible with homopolymers of the aforesaid conjugated diene.
2. A pressure sensitive normally tacky adhesive composition comprising
   (a) 100 parts by weight of a block copolymer having the general configuration

A—B—A wherein
   (1) each A is an independently selected polymer block of a vinyl arene, the average molecular weight of each A being between about 5,000 and about 125,000;
   (2) B is a polymer block of a conjugated diene, the average molecular weight of the block being between about 15,000 and about 250,000;
   (3) the total blocks A being less than about 80% by weight of the copolymer;
   (b) 25–300 parts by weight of a tackifying resin and
   (c) 5–200 parts by weight of a petroleum extender oil having an aromatic content less than about 30%.
3. An adhesive compound according to claim 1 wherein the block polymer has the configuration Polystyrene-polybutadiene-polystyrene 4. An adhesive compound according to claim 1 wherein the block polymer has the configuration Polystyrene-polyisoprene-polystyrene 5. As a new composition of matter an adhesive latex comprising
   (1) an aqueous phase;
   (2) a dispersant;
   (3) a discrete adhesive phase dispersed in the aqueous phase, said adhesive comprising the composition according to claim 1.
6. An adhesive composition comprising
   (a) 100 parts by weight of a block copolymer having the general configuration

A—B—A wherein
   (1) each A is an independently selected polymer block of a vinyl arene, the average molecular weight of each A being between about 15,000 and about 100,000;
   (2) B is a polymer block of a conjugated diene, the average molecular weight of the block being between about 25,000 and about 150,000;
   (3) the total blocks A being less than about 80% by weight of the copolymer;
   (b) 50–200 parts by weight of a tackifying resin, and
   (c) 25–125 parts by weight of an extender oil, said oil being substantially incompatible and homopolymers of the aforesaid vinyl arene and being substantially compatible with homopolymers of the aforesaid conjugated diene.
7. A composition according to claim 6 wherein the extender oil is a petroleum oil having an aromatic content less than about 30% by weight, a viscosity of 35–100 SSU at 210° F. and an initial boiling point above about 550° F.
8. A pressure sensitive adhesive composition comprising
   (a) 100 parts by weight of a block copolymer having the general configuration Polystyrene-polybutadiene-polystyrene wherein each polystyrene block has an average molecular weight between about 5,000 and 125,000 and the polybutadiene block has an average molecular weight between about 15,000 and 250,000;
   (b) 50–200 parts by weight of a tackifying esterified rosin compound, and
   (c) 25–125 parts by weight of a petroleum extender oil having an aromatic content less than 15% by weight, a viscosity of 40–75 SSU at 210° F. and an initial boiling point above 575° F.
9. A pressure-sensitive adhesive tape comprising a non-fibrous film and, overlying said film, a composition according to claim 6.
10. A hot melt adhesive comprising a non-fibrous film and, overlying said film, a composition according to claim 6.
11. An adhesive composition comprising
    (a) 100 parts by weight of a block copolymer of the group consisting of (1) polymers having the general configuration

A—B—A wherein
each A is a non-elastomeric polymer block having a glass transition temperature above 20° C., the average molecular weight of each block A being between about 5,000 and 125,000;
B is an elastomeric polymer block of a conjugated diene, the average molecular weight of the block being between 15,000 and 250,000; the total blocks A being less than 80% by weight of the copolymer;
(2) hydrogenated derivatives of polymers of type (1) and mixtures thereof; 25–300 parts by weight of a tackifying resin; and 5–200 parts by weight of an extender oil, said oil being substantially compatible with homopolymers of the conjugated diene and substantially incompatible with homopolymers of the thermoplastic blocks A.

References Cited by the Examiner

UNITED STATES PATENTS

| 2,648,650 | 8/1953 | Weinberg et al. | 260—45.75 |
| 2,784,165 | 3/1957 | Howland | 260—27 |
| 2,993,874 | 7/1961 | Hoel | 260—27 |
| 3,149,182 | 9/1964 | Porter | 260—880 |

LEON J. BERCOVITZ, *Primary Examiner.*

DONALD E. CZAJA, FRED McKELVEY,
*Assistant Examiners.*